(12) United States Patent
Conn et al.

(10) Patent No.: US 9,435,462 B2
(45) Date of Patent: Sep. 6, 2016

(54) VALVE WITH LATCHING RETURN SPRING

(71) Applicant: Hamilton Sundstrand Corporation, Windsor Locks, CT (US)

(72) Inventors: William Conn, Valley Center, CA (US); Jason Bench, San Diego, CA (US)

(73) Assignee: PRECISION ENGINE CONTROL CORPORATION, San Diego, CA (US)

( * ) Notice: Subject to any disclaimer, the term of this patent is extended or adjusted under 35 U.S.C. 154(b) by 398 days.

(21) Appl. No.: 13/899,928

(22) Filed: May 22, 2013

(65) Prior Publication Data

US 2014/0346381 A1   Nov. 27, 2014

(51) Int. Cl.
*F16K 31/56* (2006.01)
*F16K 31/00* (2006.01)
*F02C 7/232* (2006.01)

(52) U.S. Cl.
CPC ............. *F16K 31/56* (2013.01); *F02C 7/232* (2013.01); *F16K 31/003* (2013.01); *F05D 2260/38* (2013.01)

(58) Field of Classification Search
CPC .... F05D 2260/38; F02C 7/232; F16K 31/56; F16K 31/003
USPC .......... 251/68, 69, 71, 65, 101, 111, 129.13, 251/286, 288, 129.12, 313, 337
See application file for complete search history.

(56) References Cited

U.S. PATENT DOCUMENTS

| | | | | |
|---|---|---|---|---|
| 2,505,996 A * | 5/1950 | Simpelaar | ............... | F23L 13/00 126/285 R |
| 3,994,335 A * | 11/1976 | Perkins | ............... | F24F 3/0522 137/601.05 |
| 4,113,063 A | 9/1978 | Troy | | |
| 4,289,038 A | 9/1981 | Hore | | |
| 4,501,981 A * | 2/1985 | Hansen | ............... | H02K 37/14 310/209 |
| 4,533,114 A * | 8/1985 | Cory | ............... | F16K 17/386 137/75 |
| 5,261,446 A | 11/1993 | Baker | | |
| 5,624,100 A * | 4/1997 | Bolte | ............... | F02D 9/1065 251/129.01 |
| 5,785,296 A * | 7/1998 | Peube | ............... | F02D 11/10 251/129.11 |
| 6,997,430 B2 * | 2/2006 | Denning | ............... | F16K 31/047 251/129.11 |
| 7,665,714 B2 | 2/2010 | Strumbo et al. | | |
| 7,712,317 B2 * | 5/2010 | Scanlon | ............... | F01D 25/12 137/808 |
| 2005/0046531 A1 * | 3/2005 | Moyer | ............... | F01L 9/04 335/256 |
| 2008/0083892 A1 * | 4/2008 | Fenton | ............... | F16K 3/0254 251/68 |
| 2009/0189108 A1 * | 7/2009 | Ritter | ............... | E03C 1/0403 251/304 |

FOREIGN PATENT DOCUMENTS

WO         0248590 A1       6/2002

* cited by examiner

*Primary Examiner* — John K Fristoe, Jr.
*Assistant Examiner* — Josephine Trinidad-Borges (57) ABSTRACT

A valve according to an exemplary aspect of the present disclosure includes, among other things, a return spring. A latch mechanism includes a first magnet and a second magnet. One of the first and second magnets magnetically latches to the other first and second magnets in response to a control signal to minimize decompression of said return spring.

20 Claims, 7 Drawing Sheets

VALVE WITH LATCHING RETURN SPRING

BACKGROUND

This disclosure relates to a valve for metering a fluid source, and more particularly to a valve having a fail-safe feature.

A gas turbine engine typically includes at least a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The gas turbine engine may incorporate a valve that meters an amount of fluid from a fluid source to a component of the system. For example, a combustor section of the gas turbine engine may be configured to receive an amount of fuel from a fluid source. In the event of power loss to the valve, a return spring is configured to move a metering element to a closed position, thereby providing a fail-safe feature. However, the return spring may resist actuation of the metering element while power is supplied to the valve.

SUMMARY

A valve according to an exemplary aspect of the present disclosure includes, among other things, a return spring and a latch mechanism including a first magnet and a second magnet. One of the first and second magnets magnetically latches to the other first and second magnets in response to a first control signal to minimize decompression of the return spring.

In a further non-limiting embodiment of the foregoing valve, at least one of the first and second magnets is an electromagnet configured to receive the first control signal.

In a further non-limiting embodiment of either of the foregoing valves, an engagement mechanism is configured to move a valve drive shaft from an open position to a closed position in response to decompression of the return spring.

In a further non-limiting embodiment of any of the foregoing valves, the valve stem is free to move between the open position and the closed position when one of the first and second magnets magnetically latches to the other one of the first and second magnets.

In a further non-limiting embodiment of any of the foregoing valves, the engagement mechanism includes a valve disc mechanically attached to the valve drive shaft and an engagement pin attached to the return spring. The engagement pin is configured to be partially received within a channel defined by the valve disc.

In a further non-limiting embodiment of any of the foregoing valves, the engagement mechanism includes a damper adjacent to the channel for receiving the engagement pin when the first and second magnets are unlatched.

In a further non-limiting embodiment of any of the foregoing valves, the engagement mechanism includes a clutch disc spaced axially from a valve disc. The clutch disc is attached to the return spring and the valve disc is attached to the valve drive shaft. One of the clutch disc and the valve disc is moveable in the axial direction between a first axial position and a second axial position to selectively engage the other one of the clutch disc and the valve disc.

In a further non-limiting embodiment of any of the foregoing valves, a solenoid is configured to receive a second control signal. The solenoid is configured to electromagnetically latch to one of the clutch disc and the valve disc in response to the second control signal. One of the clutch disc and the valve disc includes a magnetic material for cooperating with the solenoid.

In a further non-limiting embodiment of any of the foregoing valves, the engagement mechanism includes a valve disc disposed about the valve drive shaft. The valve disc defines a first set of abutments for engaging a second set of abutments of the valve drive shaft.

In a further non-limiting embodiment of any of the foregoing valves, a metering element is mechanically attached to the valve drive shaft.

In a further non-limiting embodiment of any of the foregoing valves, the metering element is a rotary valve.

In a further non-limiting embodiment of any of the foregoing valves, the metering element is a linear valve.

In a further non-limiting embodiment of any of the foregoing valves, the first control signal is generated by an electric motor configured to rotate a valve stem.

A turbine engine according to an exemplary aspect of the present disclosure includes, among other things, a fluid source and a valve configured to regulate an amount of fluid flow from the fluid source. The valve includes a return spring and a latch mechanism. The latch mechanism includes a first magnet and a second magnet. At least one of the first and second magnets is configured to receive a control signal. One of the first and second magnets magnetically latches to the other of the first and second magnets in response to a first control signal to minimize decompression of the return spring.

In a further non-limiting embodiment of the foregoing turbine engine, at least one of the first and second magnets is an electromagnet configured to receive the first control signal.

In a further non-limiting embodiment of either of the foregoing turbine engines, an engagement mechanism is configured to move a valve stem from an open position to a closed position in response to decompression of the return spring.

In a further non-limiting embodiment of any of the foregoing valves, the valve stem is free to move between the open position and the closed position when one of the first and second magnets magnetically latches to the other of the first and second magnets.

A method of operating a valve according to another exemplary aspect of the present disclosure includes, among other things, compressing a return spring and latching the return spring in response to a control signal to minimize decompression of the return spring.

In a further non-limiting embodiment of the foregoing method of operating a valve, the method includes the step of unlatching the return spring to move the valve stem to a closed position.

In a further non-limiting embodiment of either of the foregoing methods of operating a valve, the step of latching includes electromagnetically latching.

These and other features disclosed herein can be best understood from the following specification and drawings, the following of which is a brief description.

DETAILED DESCRIPTION

Figure 1:
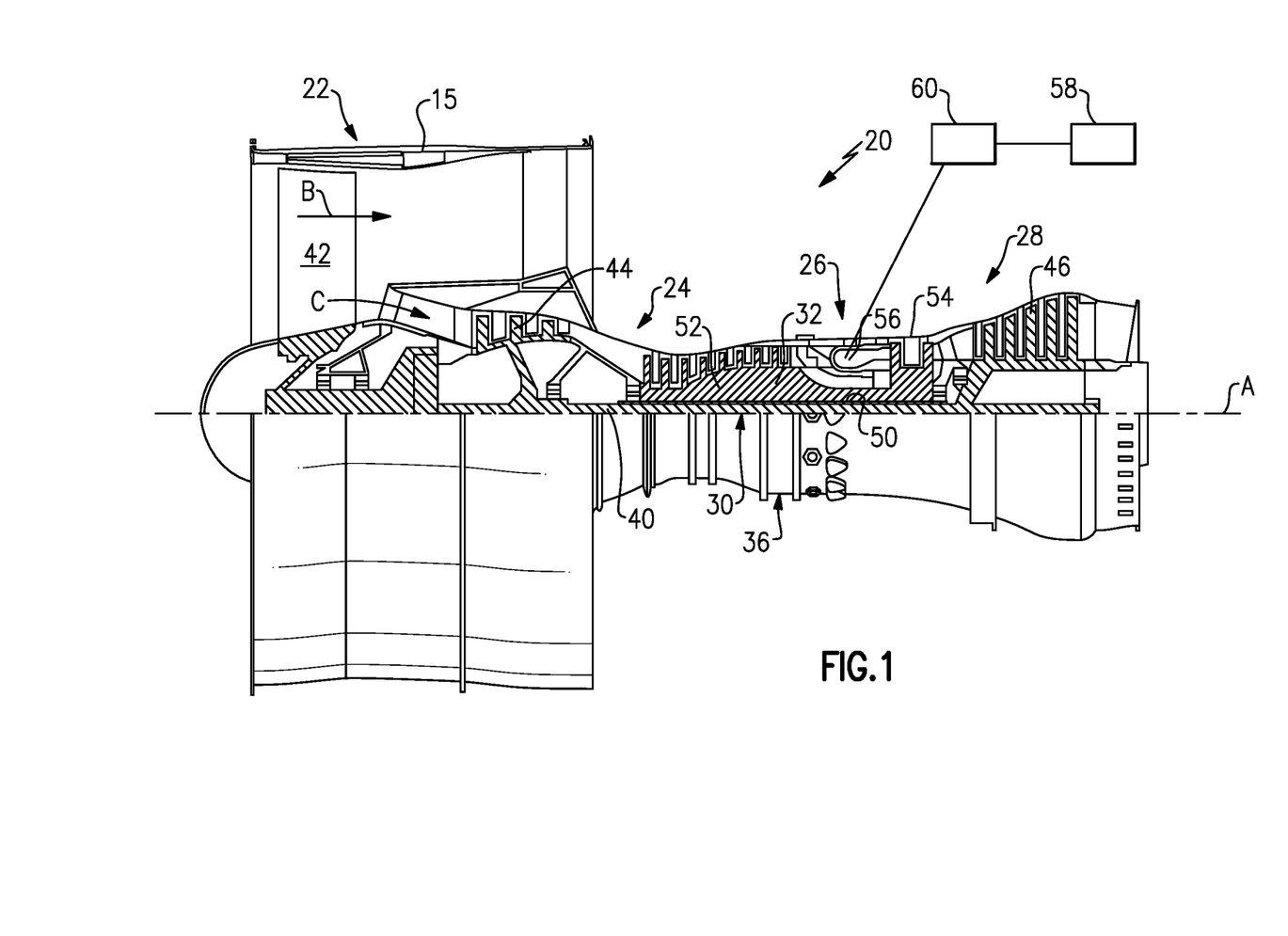
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36.

The low speed spool 30 generally includes an inner shaft 40 that interconnects a fan 42, a low pressure compressor 44 and a low pressure turbine 46. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26 and turbine section 28 may be varied.

The combustor 56 is configured to receive an amount of fuel from a fluid source 58 (shown schematically). A valve 60 is disposed between the combustor 56 and the fluid source 58 to regulate the amount of fuel.

Figure 2:
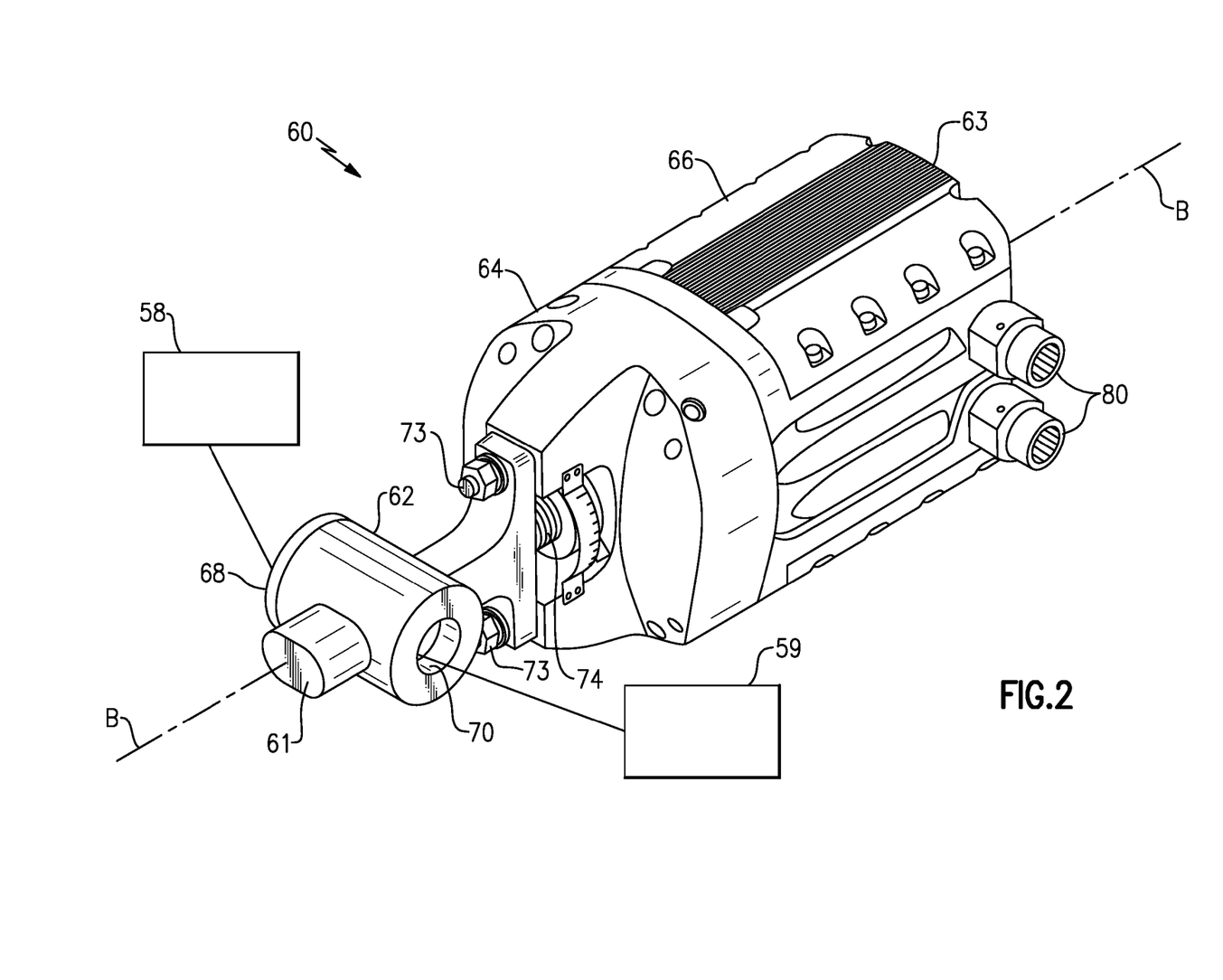
FIG. 2 is a perspective view of a valve that may be employed by a gas turbine engine.

FIG. 2 illustrates a valve 60 according to one embodiment of the present disclosure. The valve 60 is shown as a rotary valve. However, other valve configurations are contemplated, including a linear valve arrangement as discussed below. The valve 60 meters an amount of fluid between a fluid source 58 (shown schematically in FIG. 1) and a component 59 of the aircraft. In one embodiment, fluid source 58 is a fuel tank and the component 59 is the combustor 56 (shown in FIG. 1). However, other parts of the gas turbine engine 20 and other systems may benefit from these teachings. In another embodiment, the valve 60 meters an amount of hydraulic fluid provided by a hydraulic fluid source. In yet another embodiment, the valve 60 meters an amount of fluid for an industrial turbine engine or another ground-based system. In yet another embodiment, the valve 60 may also meter an amount of fluid for an automotive system. In yet another embodiment, the valve 60 meters an amount of fluid in an industrial process. Generally, the valve 60 may be used in any system to provide a fail-safe feature to return or locate a valve in either an open position or a closed position in response to a condition.

The valve 60 includes a first end 61 and a second end 63. The valve 60 includes a valve assembly 62, a main housing 66 and a spring housing 64 between the valve assembly 62 and the main housing 66. The valve assembly 62 is located at the first end 61 of the valve 60. The valve assembly 62 defines a bore 67 provided with an inlet 68 for receiving an amount of fluid from the fluid source 58 and an outlet 70 in fluid communication with the combustor 56. The valve assembly 62 includes a metering element 72 (shown in FIG. 3) received within the bore 67 and is attached to a valve drive shaft 74 extending along a valve longitudinal axis B. Generally, the metering element 72 is a ball valve or butterfly valve. However, other valve configurations may be used. The valve assembly 62 may be attached to the spring housing 64 by a pair of fasteners 73. In another embodiment, the valve assembly 62 is integrally formed with the spring housing 64.

Figure 3:
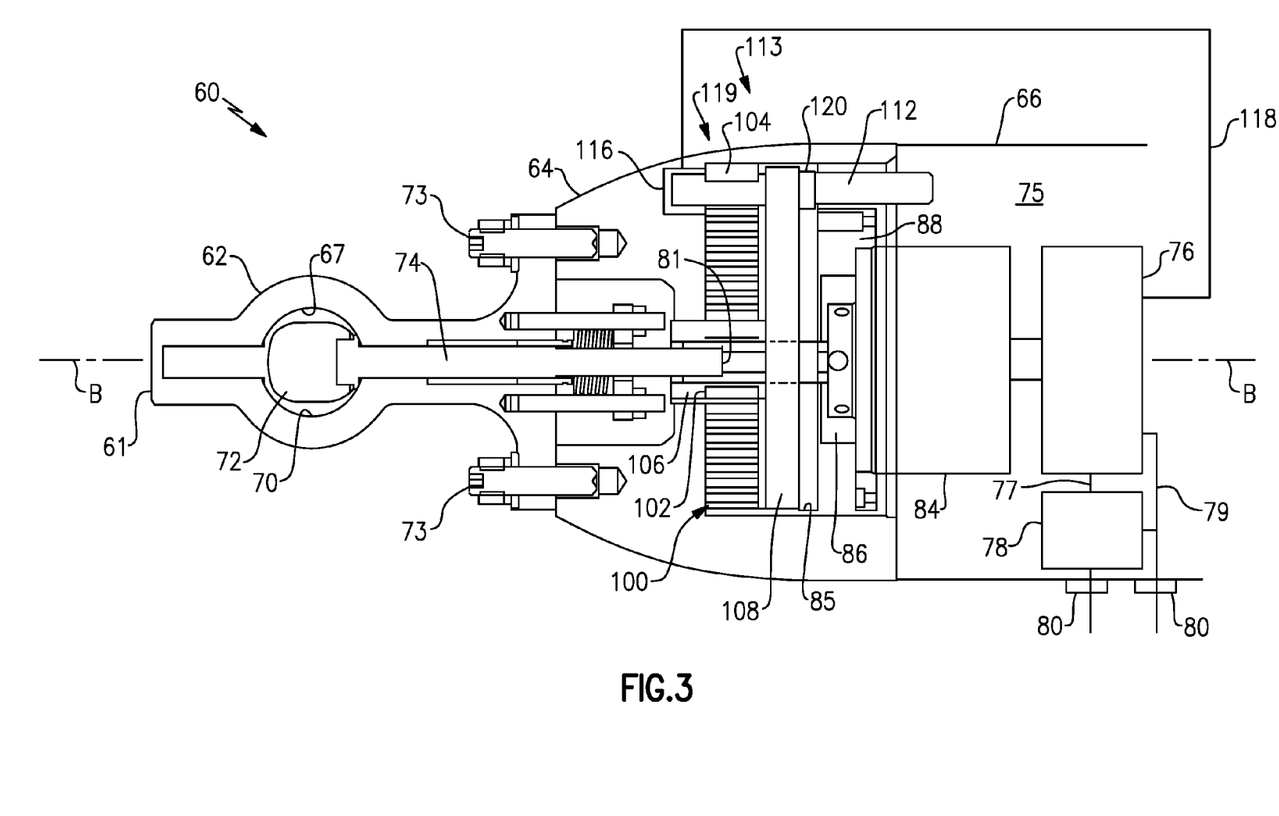
FIG. 3 is a partial cutaway view of the valve of FIG. 2.

Referring to FIG. 3, the main housing 66 is located at the second end 63 of the valve 60 and defines a main chamber 75 for receiving an actuator 76 (shown schematically). The actuator 76 is configured to rotate the metering element 72 about the valve longitudinal axis B between an open position (not shown) and a closed position. In one embodiment, the actuator 76 is a brushless DC electric motor. An on-board controller 78 (shown schematically) is configured to send the actuator 76 a flow signal 77 to adjust a flow rate of fluid from the fluid source 58. The main housing 66 includes one or more ports 80 to provide an amount of power to the on-board controller 78 and the actuator 76 by way of a power signal 79. The ports 80 may also provide one or more communication signals to and from other sub-systems.

The actuator 76 may be mechanically coupled to a gear box 84 (shown schematically). In one embodiment, the gear box 84 includes a planetary gear architecture. The gear box 84 is mechanically coupled to an actuator drive shaft 86 extending along the valve longitudinal axis B. The actuator drive shaft 86 is configured to receive a distal end 81 of the valve drive shaft 74. In one embodiment, the shafts 74, 86 are mechanically attached to each other. In another embodiment, the shafts 74, 86 define a spline connection. In yet another embodiment, the shafts 74, 86 are integrally formed. Generally, the metering element 72 rotates in response to rotation of the actuator drive shaft 86.

The spring housing 64 defines a spring chamber 85 for receiving the actuator drive shaft 86. A mechanical stop ring 88 extends partially about a circumference of the actuator drive shaft 86. A mechanical stop tab 90 (shown in FIG. 4A) is attached to the actuator drive shaft 86 and is configured to engage a pair of abutments 92, 94 defined by the mechanical stop tab 90. Generally, the abutments 92, 94 are spaced apart to define an arc length corresponding to the rotation of the metering element 72 in a direction 96 (shown in FIG. 4A) between the open position and the closed position.

The valve 60 provides a fail-safe feature by way of a return spring 100 for returning the metering element 72 to the closed position. The return spring 100 is received within the spring chamber 85 adjacent to a valve disc 108 and extends radially about the valve longitudinal axis B. In one embodiment, the return spring 100 is a coil spring. In another embodiment, the return spring 100 is a torsion spring. However, other spring configurations are also contemplated such as one or more compression springs. Generally, the return spring 100 is wound or compressed when the metering element 72 is located in the open position and unwound or decompressed when the metering element 72 is located in the closed position. The return spring 100 is configured to resist rotation of the actuator drive shaft 86 by the actuator 76 to the open position. The return spring 100 assists rotation of the actuator drive shaft 86 to the closed position. Thus, the return spring 100 produces an asymmetrical load on the actuator drive shaft 86.

The valve 60 includes an engagement mechanism 113 for providing selective engagement of the return spring 100 and the actuator drive shaft 86. The return spring 100 includes an inner tang 102 and an outer tang 104. The inner tang 102 is received in a spring carrier 106 extending along the axis B. Generally, the spring carrier 106 surrounds a portion of at least one of the drive shafts 74, 86. The spring carrier 106 may be attached to the spring housing 64 or another static structure to minimize relative rotation of the spring carrier 106 with respect to the actuator drive shaft 86. Generally, the outer tang 104 of the return spring 100 is mounted to a spring pin 112. In one embodiment, the outer tang 104 includes a generally arcuate configuration for at least partially extending about a circumference of the spring pin 112 (shown in FIG. 4B).

A valve disc 108 having a generally circular configuration about the axis B is spaced apart axially from the return spring 100. The valve disc 108 is attached to the actuator drive shaft 86 and is configured to rotate therewith. The spring pin 112 is configured to engage a portion of the valve disc 108. Referring to FIG. 4B, the valve disc 108 defines a disc channel 110 configured to receive a portion of the spring pin 112. The valve disc 108 is configured to rotate with the actuator drive shaft 86 (shown in FIG. 3) in the direction 96. The disc channel 110 defines a left wall 109 and a right wall 111 for engaging the spring pin 112.

Figure 4A:
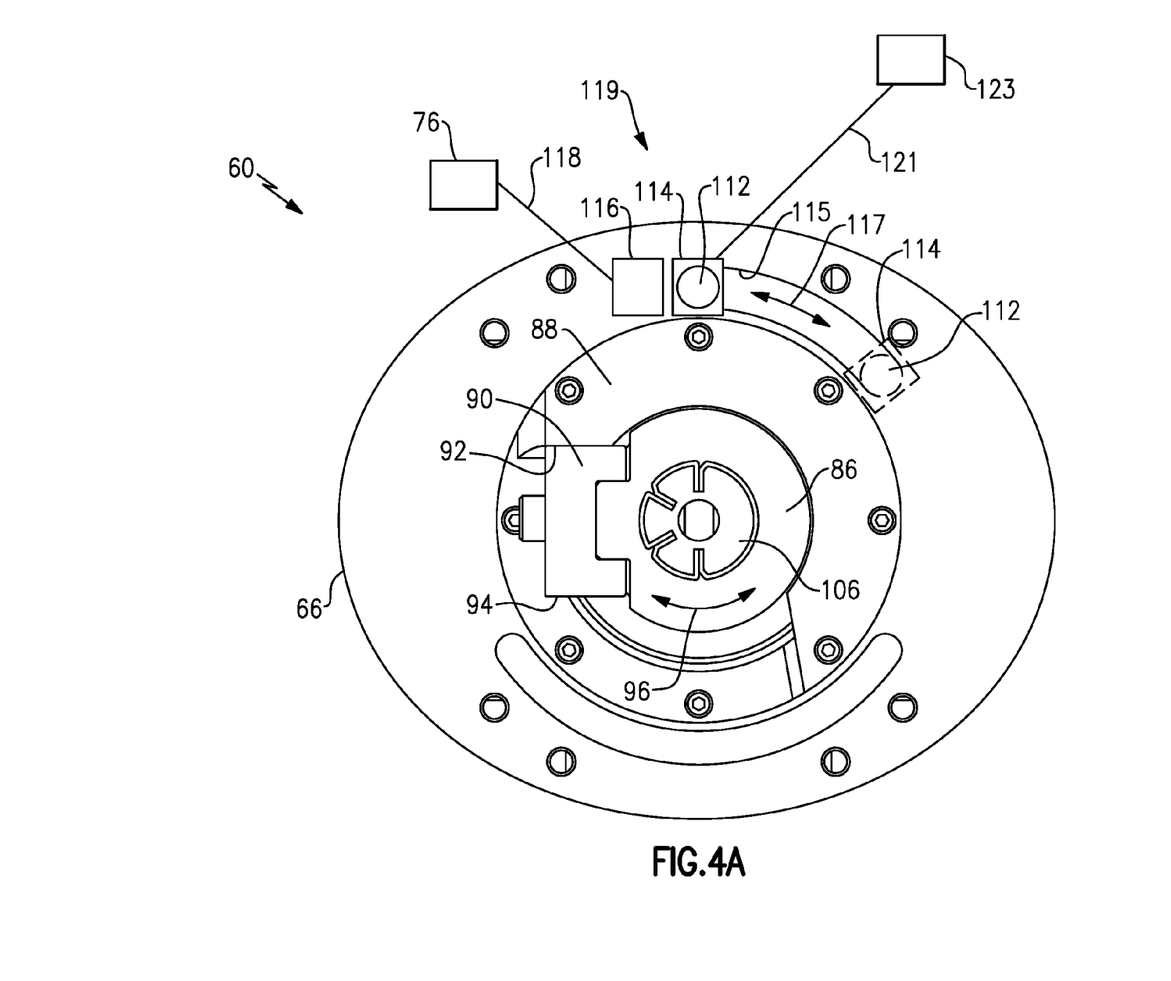
FIG. 4A is a side view of a main housing and a magnetic latch mechanism of a valve.
Figure 4B:
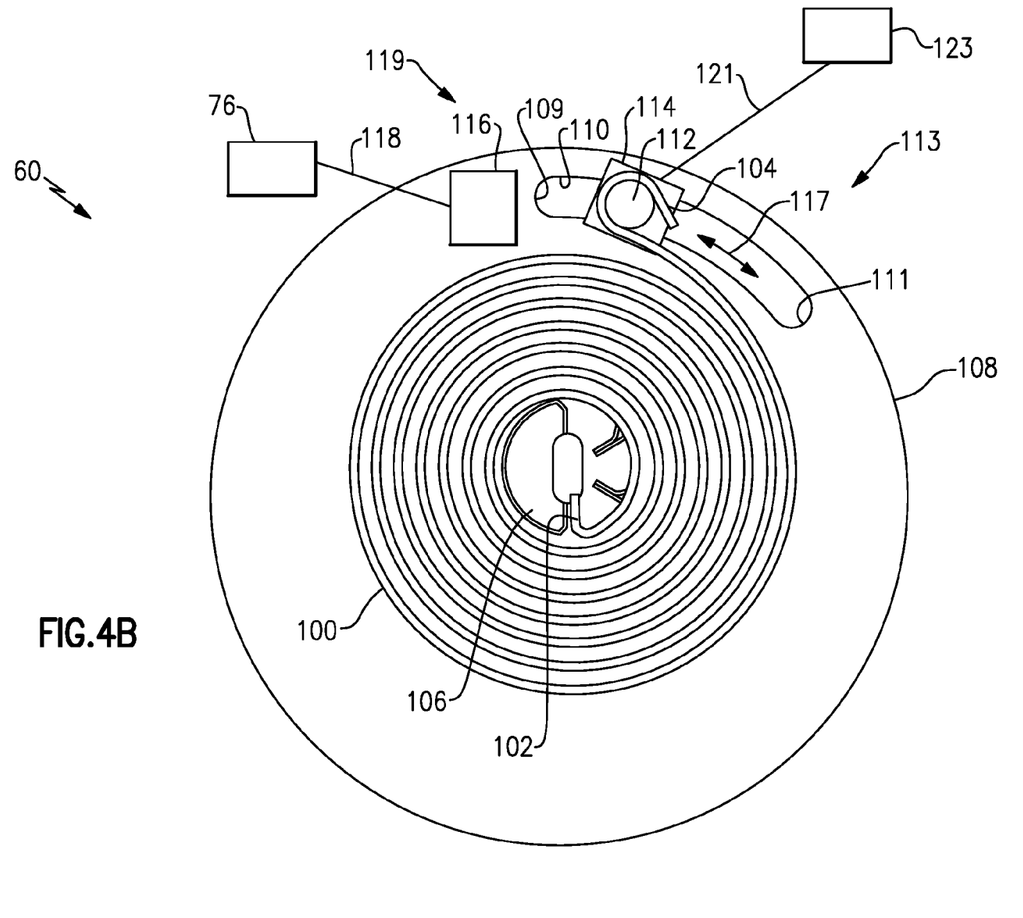
FIG. 4B is a side view a main housing and an engagement mechanism of a valve.

Referring to FIGS. 4A and 4B, the valve 60 includes a magnetic latch mechanism 119 to minimize unwinding of the return spring 100. The latch mechanism 119 allows the actuator drive shaft 86 and the valve disc 108 to rotate independent of the return spring 100 during normal operation of the valve 60. In one embodiment, the magnetic latch mechanism 119 includes a first magnet 114 and a second magnet 116 (each shown schematically). In one embodiment, the first magnet 114 is a permanent magnet attached to the outer tang 104 of the return spring 100. In another embodiment, the first magnet 114 is attached to the spring pin 112. In yet another embodiment, a portion of the spring pin 112 includes a magnetic material. In yet another embodiment, both the first and second magnets 114, 116 are both electromagnets having an opposite polarity when energized. Generally, the outer tang 104 and the first magnet 114 move together about the valve axis B in a circumferential direction 117 (as best seen in FIG. 4A). The main housing 66 may include a peripheral groove 115 for receiving a portion of the spring pin 112 to guide the rotation of the spring pin 112 about the axis B (shown in FIG. 4B).

Generally, the second magnet 116 is attached to the spring housing 64 or another static structure (illustrated schematically in FIG. 3). In one embodiment, the second magnet 116 is an electromagnet and is configured to receive a control signal 118. In one embodiment, the actuator 76 provides the control signal 118 to the second magnet 116. In another embodiment, the first magnet 114 is an electromagnet and is configured to receive the control signal 118. In yet another embodiment, the controller 78 provides the control signal 118. In yet another embodiment, the control signal 118 is the power signal 79 provided to the actuator 76. The magnetic latch mechanism 119 is normally open. Thus, the second magnet 116 is energized when an amount of voltage is provided to the control signal 118, and the second magnet 116 is de-energized when the voltage is absent. In another embodiment, the magnetic latch mechanism 119 is normally closed, as known in the art. In yet another embodiment, the first magnet 114 is an electromagnet configured to receive a secondary signal 121 provided by a secondary subsystem 123 (shown schematically in FIGS. 4A and 4B). In this arrangement, the magnetic latch mechanism 119 may unlatch in response to a loss of either the control signal 118 or the secondary signal 121. For example, the magnetic latch mechanism 119 may unlatch in response to a loss of power to the valve 60, to another component of the aircraft or system, or a loss of power to both the valve 60 and another component of the system. In yet another embodiment, the first and second magnets 114, 116 are both configured to receive the control signal 118.

When the second magnet 116 is energized, the first and second magnets 114, 116 have an opposite polarity and are therefore magnetically attracted to each other. Accordingly, the second magnet 116 electromagnetically latches to the first magnet 114 when the first magnet 114 is rotated counterclockwise in the direction 117 to position the first magnet 114 adjacent to the second magnet 116. In this position, the spring pin 112 minimizes unwinding of the return spring 100. Thus, the actuator drive shaft 86 and the valve disc 108 may rotate independent of the return spring 100 when the return spring 100 is electromagnetically latched by way of the first magnet 114. When the second magnet 116 is de-energized, the return spring 100 begins to unwind or decompress, causing the spring pin 112 to rotate clockwise in the direction 117. The spring pin 112 engages the right wall 111 of the disc channel 110 and rotates the valve disc 108 therewith to the closed position.

The spring pin 112 may be positioned a distance away from the right wall 111 of the disc channel 110 when the second magnet 116 is de-energized. Thus, the spring pin 112 may accelerate toward the right wall 111 of the disc channel 110 and produce a shock load on the valve disc 108 and the spring pin 112 upon engagement with the right wall 111. Over a period of time, the spring pin 112 and the valve disc 108 may begin to wear beyond a predetermined threshold, causing degradation in the performance of the fail-safe feature of the valve 60. The engagement mechanism 113 may include a damper 120 (shown schematically in FIG. 3) for receiving a portion of the spring pin 112 when the spring pin 112 is positioned near the right wall 111 of the disc channel 110. Thus, the shock load on the spring pin 112 and the valve disc 108 are minimized.

An exemplary operation of the valve 60 is as follows. During system initialization, the second magnet 116 is energized in response to receiving the control signal 118. The controller 78 sends the flow signal 77 to the actuator 76 causing the actuator 76 to rotate the actuator drive shaft 86 counterclockwise in the direction 96 toward the open position. The spring pin 112 engages a right wall 111 of the disc channel 110. Accordingly, the valve disc 108 causes the spring pin 112 and the first magnet 114 to rotate counterclockwise in the direction 117 toward the second magnet 116, thereby causing the return spring 100 to wind or compress. The second magnet 116 electromagnetically latches the return spring 100 by way of the first magnet 114, to minimize unwinding or decompression of the return spring 100. The controller 78 sends the flow signal 77 to the actuator 76 to rotate the actuator drive shaft 86 clockwise in the direction 96 toward the closed position. Thereafter, the actuator drive shaft 86 may rotate independently of the return spring 100 to meter the fluid provided to the inlet 68. In the event of loss of the control signal 118, and in particular power loss to the actuator 76, the first and second magnets 114, 116 electromagnetically unlatch from each other. The return spring 100 begins to unwind or decompress, causing the spring pin 112 to rotate clockwise in the direction 117 to engage the right wall 111 of the valve disc 108. Accordingly, the valve disc 108 rotates clockwise in the direction 96 until the mechanical stop tab 90 engages the abutment 92 and the metering element 72 is rotated to the closed position. When power is restored to the actuator 76, the latch mechanism 119 may be re-initialized.

Figure 5:
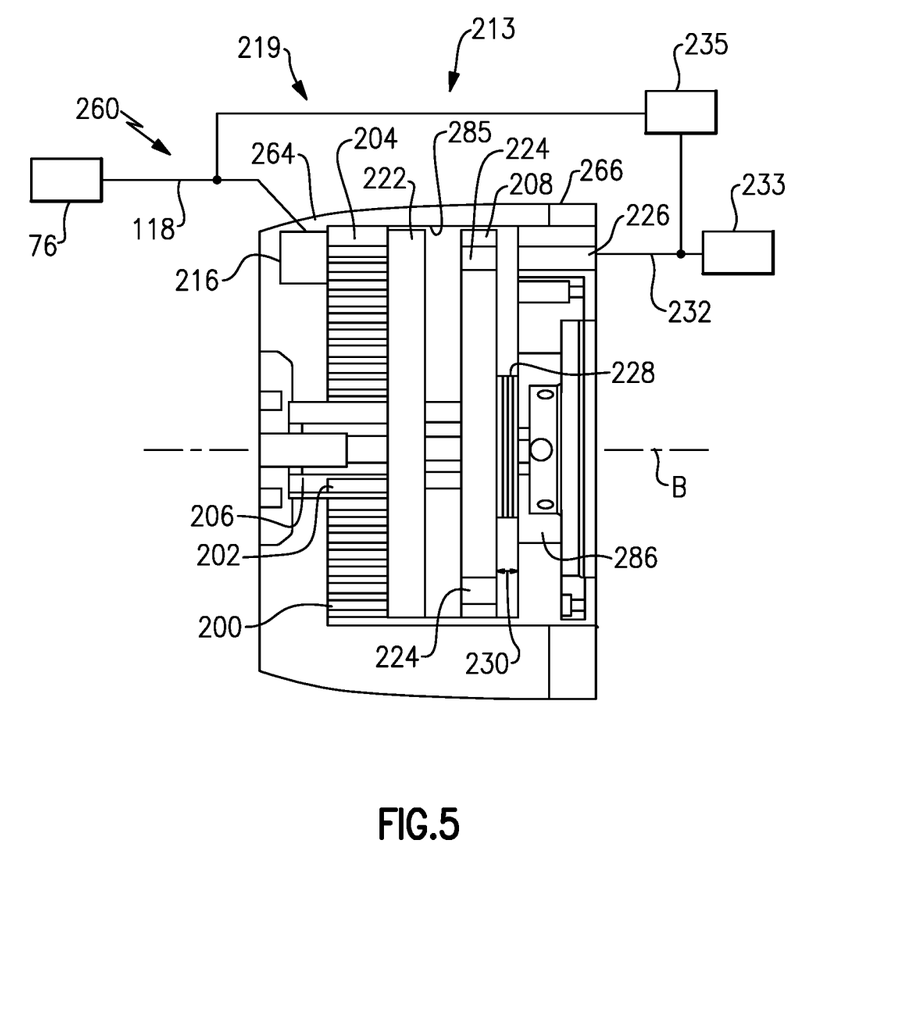
FIG. 5 is a partial cutaway view of a second embodiment of a valve.

FIG. 5 illustrates a second embodiment of a valve 260. In this disclosure, like reference numerals designate like elements where appropriate and reference numerals with the addition of one-hundred or multiples thereof designate modified elements that are understood to incorporate the same features and benefits of the corresponding original elements. An engagement mechanism 213 includes a valve disc 208 and a clutch disc 222 spaced apart axially from the valve disc 208. The discs 208, 222 are configured to create an amount of mechanical friction when the discs 208, 222 contact each other, causing the discs 208, 222 to rotate together about the valve longitudinal axis B. The clutch disc 222 is attached to at least one of the return spring 200 and the first magnet 214 (shown in FIGS. 4A and 4B). Accordingly, the clutch disc 222 winds or compresses the return spring 200 when the clutch disc 222 is rotated toward the open position and unwinds or decompresses the return spring 200 when the clutch disc 222 is rotated toward the closed position. The valve disc 208 is configured to move axially in a direction 230 along the axis B, relative to the clutch disc 222 and the actuator drive shaft 286. However, the valve disc 208 is configured to rotate with the actuator drive shaft 286 about the axis B. A clutch spring 228 is disposed about a portion of the actuator drive shaft 286 adjacent to the valve disc 208 and is configured to bias the valve disc 208 toward the clutch disc 222.

A solenoid 226 (shown schematically) is arranged adjacent to the valve disc 208 to compress the clutch spring 228. In one embodiment, the valve disc 208 includes a magnetic portion 224 to electromagnetically latch to the solenoid 226 when the solenoid 226 is energized. In another embodiment, the magnetic portion 224 is a permanent magnet disposed adjacent to the valve disc 208. Generally, the magnetic portion 224 has a circular configuration extending about the valve longitudinal axis B. The solenoid 226 is configured to energize in response to receiving an engagement signal 232 from an engagement control source 233 (shown schematically). In one embodiment, the engagement control source 233 includes a circuit defined at least partially by the first and second magnets 216, 218 configured to generate the engagement signal 232 when the magnets 216, 218 are magnetically or electromagnetically latched. In another embodiment, the controller 78 (shown in FIG. 2) generates the engagement signal 232.

An exemplary operation of the engagement mechanism 213 is as follows. During system initialization, the solenoid 226 is de-energized. Accordingly, the valve disc 208 and the clutch disc 222 are in contact with each other and rotate about the axis B together. The actuator 76 (shown in FIG. 2) rotates the actuator drive shaft 286 to latch the first and second magnets 214, 216 to each other as previously described. The solenoid 226 receives the control signal 118 causing the valve disc 208 to move axially away from the clutch disc 222 in the direction 230. Thereafter, the valve disc 208 may rotate independently of the clutch disc 222. In the event of loss of the control signal 118, the first and second magnets 216, 218 unlatch. The solenoid 226 ceases to receive the engagement signal 232, causing the solenoid to electromagnetically unlatch from the magnetic portion 224 of the valve disc 208. The clutch spring 228 biases the valve disc 208 to engage the clutch disc 222. Thereafter, the return spring 200 begins to unwind or decompress, causing the clutch disc 222 to rotate the valve disc 208 until the metering element 72 (shown in FIG. 2) is located in the closed position. To ensure that the valve and clutch disc 208, 222 are engaged with each other before the return spring 200 begins to unwind or decompress, the valve 260 may include a timing circuit 235 (shown schematically) configured to maintain the control signal 118 to the second magnet 216 for a predetermined amount of time after a loss of the engagement signal 232 is detected. In another embodiment, the controller 78 includes the timing circuit 235. In another embodiment, a component of the system other than the valve 260 includes the timing circuit 235.

Figure 6:
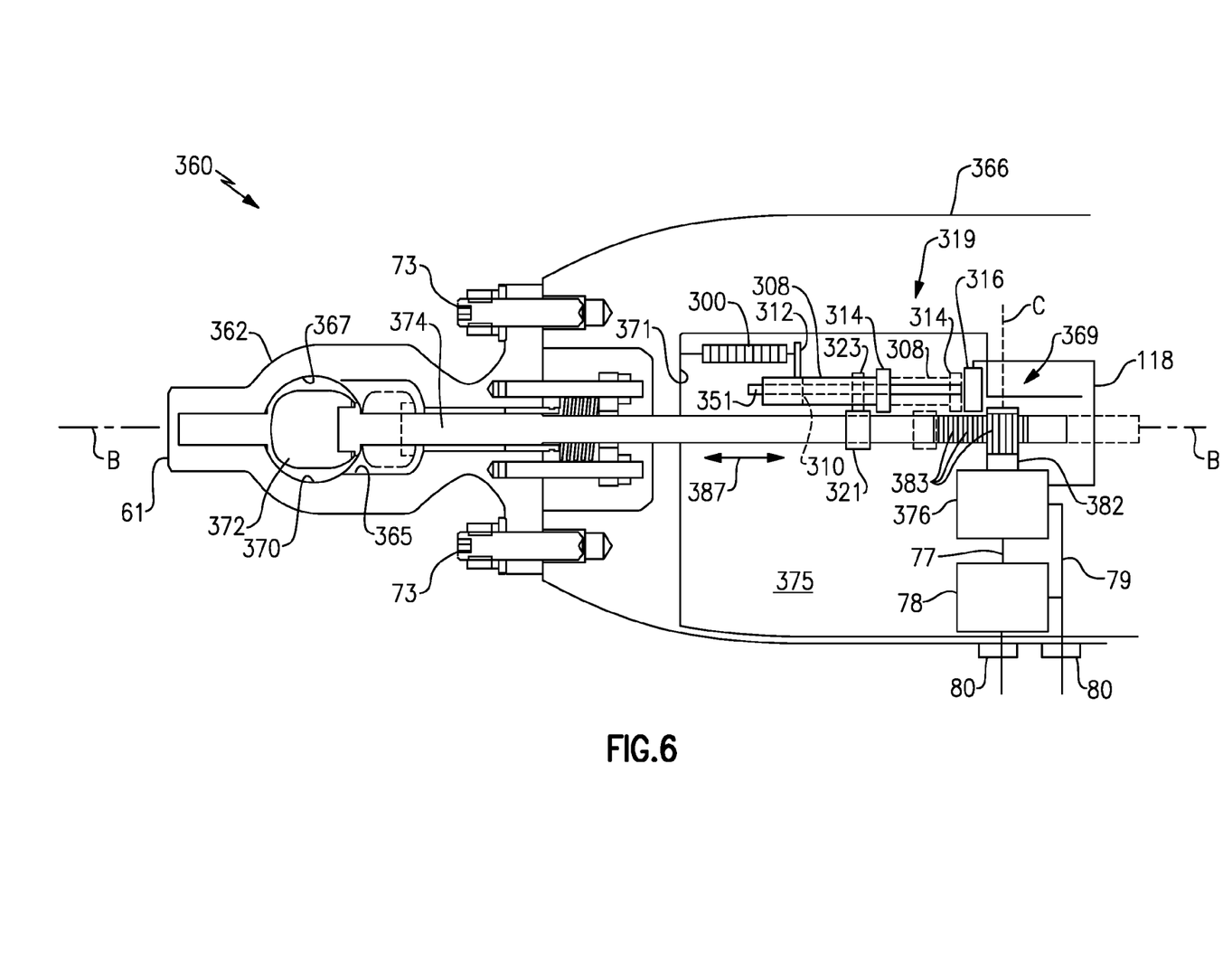
FIG. 6 is a partial cutaway view of a third embodiment of a valve.

FIG. 6 illustrates a third embodiment of a valve 360. In this embodiment, the valve 360 is shown as a linear valve. The valve 360 includes an actuator 376 for moving a metering element 372 attached to a valve drive shaft 374 between a closed position and an open position (shown in phantom). A valve assembly 362 defines a bore 367 for receiving the metering element 372 and an elongated slot 365 extending outward from the bore 367 for receiving a portion of the metering element 372 when the metering element 372 is moved along the valve longitudinal axis B toward the open position.

The actuator 376 and valve drive shaft 374 may engage each other through a rack and pinion arrangement 369. The rack and pinion arrangement 369 includes a pinion 382 defining a pinion axis C. The pinion 382 and the valve drive shaft 374 each define a plurality of teeth 383 configured to engage each other. The valve drive shaft 374 is moveable in a direction 387 along the valve longitudinal axis B in response to rotation of the pinion 382 about the pinion axis C. Although a rack and pinion configuration is shown, the valve drive shaft 374 may be actuated by other configurations as known to one of ordinary skill in the art.

The valve 360 provides a fail-safe feature by way of a return spring 300 for returning the metering element 372 to the closed position. The return spring 300 is received within the main chamber 375 adjacent to a valve shaft coupling 308 and extends a distance parallel to the axis B. In one embodiment, the return spring 300 is a tension spring. In another embodiment, the return spring 300 is a coil spring. In yet another embodiment, the return spring 300 is a torsion spring. However, other spring configurations and quantities are contemplated. The main housing 366 may define a coupling groove 351 extending radially outward from an inner surface of the main chamber 375. The coupling groove 351 is configured to receive a portion of the valve shaft coupling 308 for guiding movement of the valve shaft coupling 308 in a direction parallel to the axis B. The valve shaft coupling 308 may have a generally elongated profile extending a length parallel to the valve longitudinal axis B. However, other profiles of the valve shaft coupling 308 are contemplated.

The valve 360 includes a collar 321 adjacent to the valve shaft coupling 308. In one embodiment, the collar 321 extends about a circumference of the valve drive shaft 374 and is attached thereto. In another embodiment, the collar 321 is integrally formed with the valve drive shaft 374. An engagement pin 323 extends radially outward from the collar 321 and is received within a coupling channel 310 defined by the valve shaft coupling 308. One end of the return spring 300 is attached to a spring pin 312 extending from an outer surface of the valve shaft coupling 308. The other end of the return spring 300 is attached to an inner wall 371 of the main housing 366. Generally, the return spring 300 compresses when the valve shaft coupling 308 moves in the direction 387 away from the inner wall 371 and decompresses when the shaft coupling 308 moves in the direction 387 toward the inner wall 371.

The valve 360 includes a magnetic latch mechanism 319 to minimize decompression of the return spring 300. The latch mechanism 319 allows the valve drive shaft 374 to move along the axis B independent of the return spring 300 during normal operation of the valve 360. In one embodiment, the latch mechanism 319 includes a first magnet 314 and a second magnet 316 (each shown schematically). In one embodiment, the first magnet 314 is a permanent magnet attached to the valve shaft coupling 308 and the second magnet 316 is an electromagnet attached to the main housing 366. In another embodiment, both the first and second magnets 314, 316 are electromagnets. Generally, the valve shaft coupling 308 and the first magnet 314 move together along the valve axis B.

An exemplary operation of the valve 360 is as follows. During system initialization, the second magnet 316 is energized in response to receiving the control signal 118. The controller 78 sends the flow signal 77 to the actuator 376 causing the actuator 376 to rotate the pinion 382 about the axis C to move the valve drive shaft 374 in the direction 387 away from the inner wall 371 toward the open position. The engagement pin 323 engages a surface of the wall of the coupling channel 310 causing the return spring 300 to compress. The second magnet 316 electromagnetically latches to the first magnet 314 to minimize decompression of the return spring 300. The controller 78 sends the flow signal 77 to the actuator 376 to rotate the pinion 382 causing the valve drive shaft 374 to move toward the closed position. Thereafter, the valve drive shaft 374 may move independently of the return spring 300 to meter the fluid provided from the inlet 68 (shown in FIG. 2) to the outlet 370. In the event of loss of the control signal 118, the first and second magnets 314, 316 electromagnetically unlatch from each other. The return spring 300 begins to decompress, causing the valve shaft coupling 308 to move in the axial direction toward the inner wall 371 of the main housing 366. Accordingly, the valve shaft coupling 308 engages the pin 323, causing the collar 321 to move the valve drive shaft 374 and the metering element 372 to the closed position. When power is restored to the actuator 376, the latch mechanism 319 may be re-initialized.

Accordingly, the valve provides several benefits. The valve may include an actuator or electric motor capable of generating a lower amount of torque than necessary to overcome the spring force of the return spring, and the power electronics may be selected to provide a lesser amount of current to the electric motor. Additionally, the magnetic latch mechanism may require fewer mechanical parts susceptible to wear and thereby having greater accuracy in the positioning of the metering element during normal operation. Also, an algorithm executed by an onboard controller for operating the electric motor may be simplified while accurately positioning the metering element.

Although the different embodiments have the specific components shown in the illustrations, embodiments of this disclosure are not limited to those particular combinations. It is possible to use some of the components or features from one of the embodiments in combination with features or components from another one of the embodiments. It should be appreciated that the valve 60, 260, 360 may be used in any system to provide a fail-safe feature to return or locate a valve in either an open position or a closed position in response to a condition. Generally, the valve 60, 260, 360 may be used to meter any fluid, including fuel, hydraulic fluid or water. The valve 60, 260, 360 may be used to meter a fluid in any state, including liquids, gases and slurries.

The preceding description is exemplary rather than limiting in nature. Variations and modifications to the disclosed embodiments may become apparent to those skilled in the art that do not necessarily depart from the essence of this disclosure. The scope of legal protection given to this disclosure can only be determined by studying the following claims.

What is claimed is:

1. A valve, comprising:
 a return spring;
 a latch mechanism including a first magnet and a second magnet, wherein one of said first and second magnets magnetically latches to the other said first and second magnets in response to a first control signal to minimize decompression of said return spring such that said return spring is compressed; and
 an engagement mechanism configured to move a valve drive shaft from an open position to a closed position in response to decompression of said return spring, wherein said valve drive shaft is free to move between said open position and said closed position independent of said return spring when said one of said first and second magnets magnetically latches to said other said first and second magnets.

2. The valve of claim 1, wherein at least one of said first and second magnets is an electromagnet configured to receive said first control signal.

3. The valve of claim 1, wherein said engagement mechanism includes a valve disc mechanically attached to said valve drive shaft and an engagement pin attached to said return spring, said engagement pin configured to be partially received within a channel defined by said valve disc.

4. The valve of claim 1, wherein said engagement mechanism includes a clutch disc spaced axially from a valve disc, said clutch disc attached to said return spring and said valve disc attached to said valve drive shaft, and wherein one of said clutch disc and said valve disc is moveable in the axial direction between a first axial position and a second axial position to selectively engage the other said clutch disc and said valve disc.

5. The valve of claim 4, comprising a solenoid configured to receive a second control signal, said solenoid configured to electromagnetically latch to one of said clutch disc and said valve disc in response to said second control signal, wherein one of said clutch disc and said valve disc includes a magnetic material for cooperating with said solenoid.

6. The valve of claim 1, wherein said engagement mechanism includes a valve disc disposed about said valve drive shaft, said valve disc defining a first set of abutments for engaging a second set of abutments of said valve drive shaft.

7. The valve of claim 1, comprising a metering element mechanically attached to said valve drive shaft.

8. The valve of claim 7, wherein said metering element is a rotary valve.

9. The valve of claim 7, wherein said metering element is a linear valve.

10. The valve of claim 1, wherein said first control signal is generated by an electric motor configured to rotate a valve stem, said electric motor being separate and distinct from said latch mechanism.

11. The valve of claim 3, wherein said engagement pin is moveable within said channel between a first position and a second position bounded by end walls of said channel when said first and second magnets magnetically unlatch, said first position corresponding to compression of said return spring, said second position corresponding to decompression of said return spring, and said first magnet is attached to said engagement pin.

12. The valve of claim 6, wherein said first set of abutments are spaced apart from said second set of abutments to define an arc length corresponding to rotation of said valve drive shaft between said open position and said closed position.

13. A valve comprising:
a return spring; and
a latch mechanism including a first magnet and a second magnet, wherein one of said first and second magnets magnetically latches to the other said first and second magnets in response to a first control signal to minimize decompression of said return spring such that said return spring is compressed;
an engagement mechanism configured to move a valve drive shaft from an open position to a closed position in response to decompression of said return spring;
wherein said engagement mechanism includes a valve disc mechanically attached to said valve drive shaft and an engagement pin attached to said return spring, said engagement pin configured to be partially received within a channel defined by said valve disc, and wherein said engagement mechanism includes a damper adjacent to said channel for receiving said engagement pin when said first and second magnets are unlatched.

14. The valve of claim 13, wherein said one of said first and second magnets is an electromagnet configured to receive said first control signal.

15. The valve of claim 14, wherein said other said first and second magnets is an electromagnet configured to receive a second control signal different from said first control signal, and said other said first and second magnets magnetically latches to said one of said first and second magnets in response to said second control signal.

16. A turbine engine comprising:
a fluid source;
a valve configured to regulate an amount of fluid flow from said fluid source;
said valve including a return spring and a latch mechanism;
said latch mechanism including a first magnet and a second magnet, wherein at least one of said first and second magnets is configured to receive a control signal, and wherein one of said first and second magnets magnetically latch to the other said first and second magnets in response to a first control signal to minimize decompression of said return spring such that said return spring is compressed; and
an engagement mechanism configured to move a valve stem from an open position to a closed position in response to decompression of said return spring, wherein said valve stem is free to move between said open position and said closed position independent of said return spring when said one of said first and second magnets magnetically latches to said other said first second magnets.

17. The turbine engine of claim 16, wherein at least one of said first and second magnets is an electromagnet configured to receive said first control signal.

18. The turbine engine of claim 16, wherein said engagement mechanism includes a valve coupling mechanically attached to said return spring and an engagement pin attached to said valve stem, said engagement pin configured to be partially received within a channel defined by said valve coupling, and wherein said engagement mechanism includes a damper adjacent to said channel, said damper configured to receive said engagement pin in response to unlatching said first and second magnets.

19. The turbine engine of claim 16, wherein said first control signal is generated by an electric motor configured to rotate said valve stem, said electric motor being separate and distinct from said latch mechanism.

20. The turbine engine of claim 16, wherein the fluid source is a fuel tank, and said valve is configured to selectively couple the fuel tank to a combustor, said combustor in fluid communication with a turbine section.

* * * * *